United States Patent [19]

Meitzler

[11] 4,450,376
[45] May 22, 1984

[54] TRANSMISSION MEDIUM FOR APPLICATION IN ELECTRICAL AND ACOUSTICAL CONTROL SYSTEMS

[75] Inventor: Allen H. Meitzler, Ann Arbor, Mich.

[73] Assignee: Ford Motor Company, Dearborn, Mich.

[21] Appl. No.: 495,899

[22] Filed: May 18, 1983

Related U.S. Application Data

[62] Division of Ser. No. 331,721, Dec. 17, 1981.

[51] Int. Cl.³ .......................... H01L 41/08; H01B 7/00
[52] U.S. Cl. ..................... 310/334; 310/311;
  310/326; 174/110 F; 333/238
[58] Field of Search ............... 310/311, 328, 326, 334;
  333/238, 239; 375/121; 174/110 F, 119 R, 119 C

[56] References Cited

U.S. PATENT DOCUMENTS

| 2,805,276 | 9/1957 | Weitzel ........................ 174/110 F |
| 3,790,695 | 2/1974 | Floessel et al. ............. 174/110 F X |
| 3,968,463 | 7/1976 | Boysen ....................... 174/110 F X |
| 4,220,807 | 9/1980 | Anastasi et al. ............ 174/110 F X |
| 4,382,236 | 5/1983 | Suzuki ........................ 333/238 X |

FOREIGN PATENT DOCUMENTS

| 46-43871 | 12/1971 | Japan ............................. 174/110 F |
| 1330512 | 9/1973 | United Kingdom ........... 174/110 F |

*Primary Examiner*—Mark O. Budd
*Attorney, Agent, or Firm*—Paul K. Godwin, Jr.; Robert D. Sanborn

[57] ABSTRACT

An insulated transmission medium for propagating ultrasonic vibrational waves and conducting electromagnetic energy in a multiplex type communication system, whereby said medium is a metallic strip that interconnects an ultrasonic wave transmitting transducer, a D.C. power source, an ultrasonic wave receiving transducer and the controlled loads.

6 Claims, 8 Drawing Figures

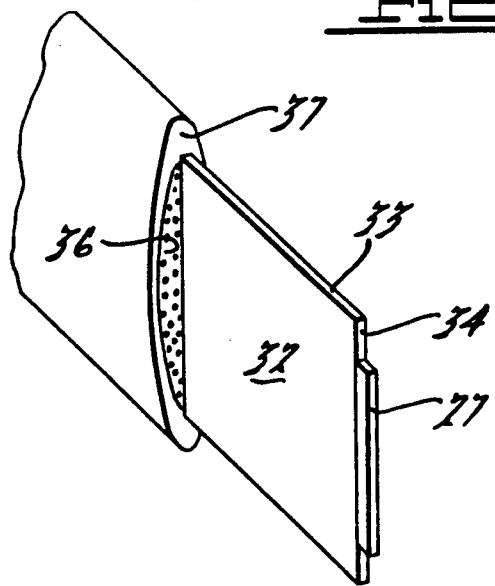
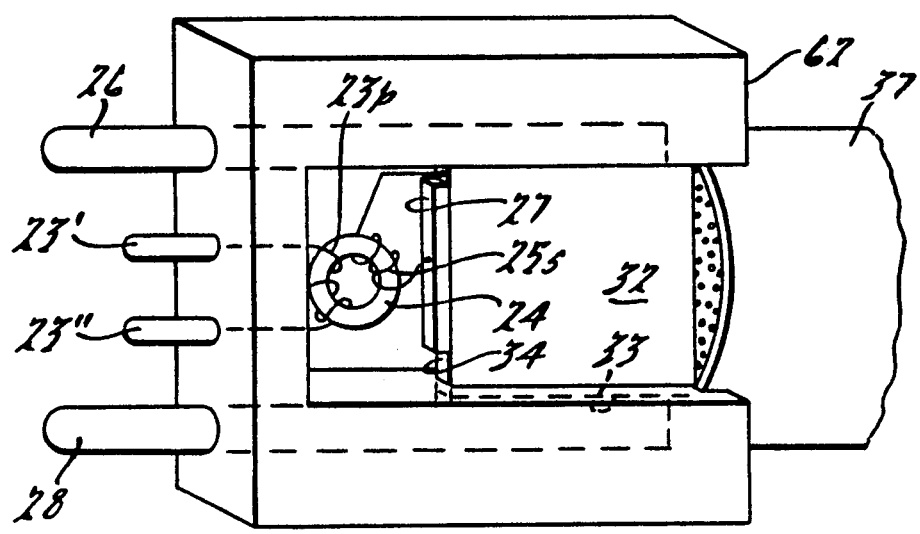

TRANSMISSION MEDIUM FOR APPLICATION IN ELECTRICAL AND ACOUSTICAL CONTROL SYSTEMS

This application is a division of Ser. No. 331,721, filed Dec. 17, 1981.

BACKGROUND OF THE INVENTION

1. Field of the Invention

The present invention is directed to the field of multiplex type communication systems and more specifically to a medium for transmitting both mechanical and electrical energy between the elements of said system.

2. Description of the Prior Art

Presently, the electrical systems of most vehicles utilize individual wires to carry electrical energy between each controlling switch and its designated load. For instance, the numerous types of loads on the rear of a vehicle may include running lights, left turn signals, right turn signals, backup lights, stop lights and rear window defroster. Each type of load conventionally requires individual control wires connecting it to a corresponding switch located near the vehicle operator's seating position. The aggregate of wiring, as a result of the conventional approach, effects substantial penalties in terms of: material costs; complexity of fabrication; space dedication; and vehicle weight.

Several types of electrical systems have been proposed which are directed to achieving a substantial reduction in the wiring content of a vehicle. A good review of those systems is contained in a paper entitled "Time-Shared Multiplexing System Applied to Motor Vehicles" by L. J. Neveti; published by the Society of Automotive Engineering, Inc., Feb. 23, 1976, as Paper No. 760181; and incorporated herein by reference. The systems described in the Neveti paper utilize at least a heavy gauge busbar type power cable ringing the vehicle and one or more of a light gauge electrical cable or fiber optic bundle running parallel to the power cable. In one instance, a frequency selective system is described which utilizes a power carrying busbar that is said to also transmit electromagnetic audio frequencies. In those instances where command signals are electrically transmitted from the command module to an appropriate receiver, there is a great potential for spurious signal introduction and electromagnetic interference (EMI) on the signal carrying medium that will affect the command signal reception. On the other hand, while the fiber optic medium for carrying the control signals overcomes the spurious signal and EMI problems of electrical command conductors, and is lighter than most conducting mediums, termination problems exist which are said to outweigh the advantages of using the fiber optic bundle as a command signal transmitting medium on vehicles.

SUMMARY OF THE INVENTION

The present invention is intended to overcome the problems found in many prior art multiplexing communication systems, as proposed for use on vehicles, by employing a single transmission medium between a command transmitting unit and a receiver unit to propagate ultrasonic command signal wave vibrations and to conduct DC power to the units and loads controlled by the receiver unit. The transmission medium comprises an elongated strip of metal, such as aluminum, which has low loss characteristics to both mechanical wave vibrations along its length and to the conduction of direct current. The strip is electrically insulated by a medium which does not mechanically load the major surfaces of the strip but does provide mechanical damping to the edges of the strip. The insulating medium comprises an inner foam core adjacent the major surfaces and a relatively stiff dielectric outer jacket that surrounds the inner foam core and contacts the edges of the strip.

The system utilizes a piezoelectric transducer at either end of the strip to convert electrical energy to mechanical wave energy, in the case of the transmitting transducer and to convert the mechanical wave energy to electrical energy, in the case of the receiving transducer. Each command is encoded to a digital signal format and used to pulse modulate a carrier frequency that is selected as being approximately the same as the resonant frequency of the piezoelectric transducers. The transmitting transducer responds to each pulse by vibrating at its resonant frequency and setting up corresponding pulses of stress waves that propagate lengthwise along the strip.

When the stress waves reach the end of the strip, the receiving transducer produces a corresponding pulse carrier at the vibration frequency. The output of the receiving transducer is demodulated and decoded. The decoder provides a plurality of signal output control lines that are respectively connected to enable and energize correspondingly connected loads. Therefore, the decoder provides an output signal on one of its control lines, in accordance with the received coded signal and enables a corresponding load to be connected between a power source and ground.

As stated above, the DC power source for the command transmitter unit, receiver unit and loads is connected to the transmission medium. The conduction of the DC power from the source to the units and loads occurs simultaneously with the mechanical wave propagation and does not affect the latter.

The physical requirements of the transmission medium to function as both a low loss mechanical wave propagation medium and a low resistance current conductor are met by using aluminum formed in an elongated strip. It is expected that other materials will be found to function in a similar manner.

It is therefore an object of the present invention to provide a single transmission medium in a communication system that propagates vibrational wave signals along its length and conducts electrical energy.

It is another object of the present invention to provide a multiplex type communication system utilizing ultrasonic control signals to enable the energization of corresponding loads from an electrical energy source.

It is a further object of the present invention to provide an electrical insulator for the aforementioned transmission medium that minimizes loading of the major surfaces subjected to vibrational stress waves in the propagation path.

It is still a further object of the present invention to provide a low cost vehicular communication system that is essentially unaffected by spurious signals or electromagnetic interference in controlling the various electrical accessory loads of the vehicle.

BRIEF DESCRIPTION OF THE DRAWINGS

FIG. 3 is a perspective end view of the present invention.

FIG. 4 is a perspective view of an embodiment of a termination connector for the present invention.

DETAILED DESCRIPTION OF THE PREFERRED EMBODIMENT

Figure 1:
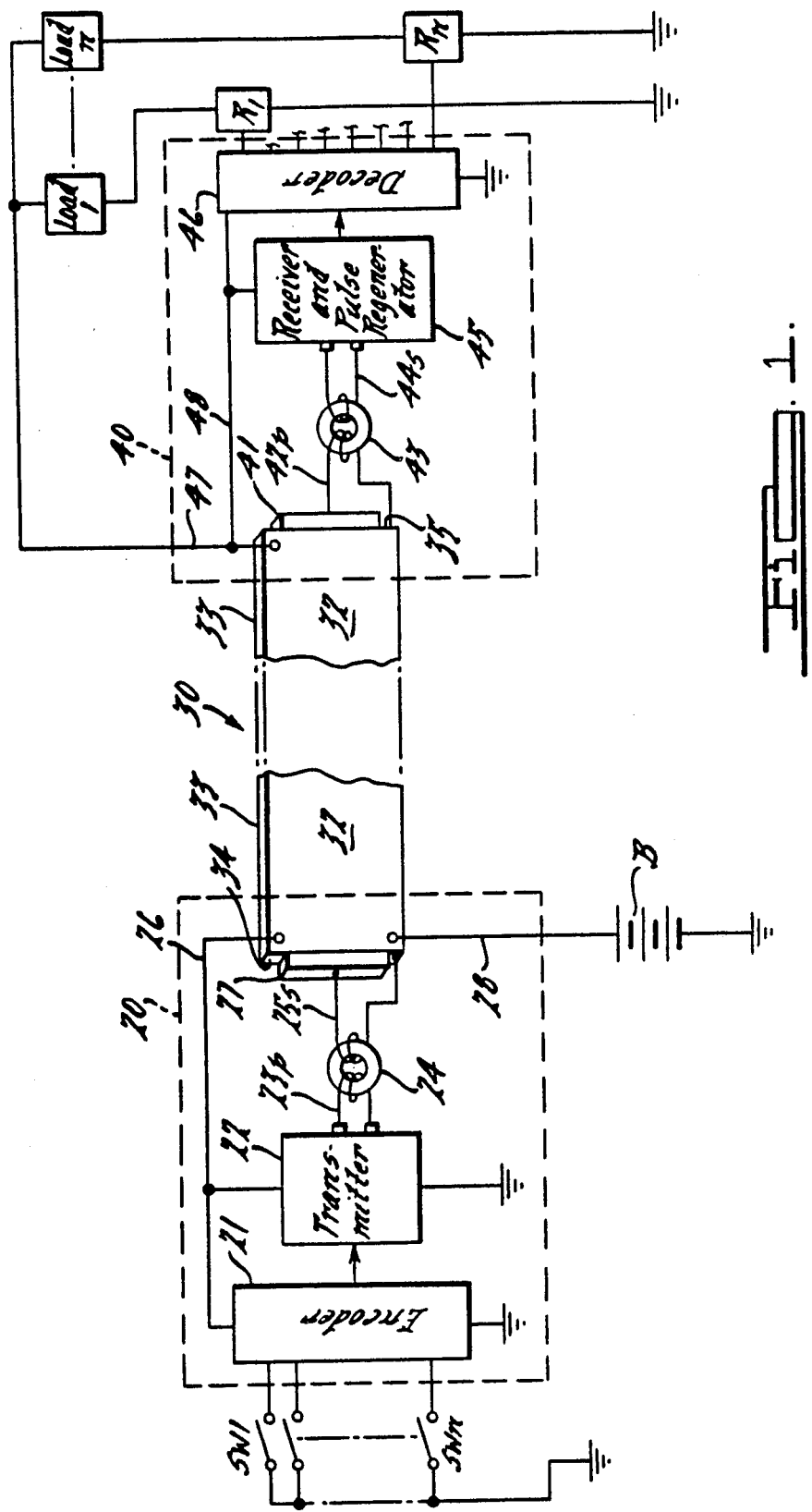
FIG. 1 is a conceptual block diagram of a preferred embodiment of the present invention.

FIG. 1 shows a metal strip transmission medium 30 interconnecting a command transmitter module 20 and a receiver module 40. DC power is supplied by a battery B through a line 28 to the entire system. The command module 20 is interconnected with a plurality of "n" input switches $SW_1$–$SW_n$ that may be individually activated to command a specific and corresponding load to be energized. Each of the "n" input switches are connected to respective lines on an encoder 21 and when closed, ground that line. The encoder 21 converts the state of the input switches to a sequence of digital words. Each digital word contains six bits which include a start bit; four bits to identify the particular switch that is closed; and a stop bit. The encoder 21 sequences through the input switching lines and produces a digital word for each closed switch. The digital words are serially output from the encoder to a transmitter 22 which generates an rf pulse train corresponding to the pulses output from the encoder. The output pulses from the transmitter 22 are output to a primary winding $23_p$ of an isolation transformer 24 and output therefrom on a secondary winding $25_s$. The output of the isolation transformer 24 is fed to a transmitting transducer 27 which generates stress wave vibrations that propagate along the length of the strip 30. The receiver module 40 is connected to a receiving transducer 41 mounted on the opposite end of the strip 30 and converts the transmitted stress wave pulses to electrical energy pulses at its resonant frequency. The electrical energy pulses are communicated through a primary winding $42_p$ of an isolation transformer 43 and through its secondary winding $44_s$ to a receiver and pulse regenerator circuit 45. The circuit 45 demodulates the carrier from the received signals and supplies DC pulses to a decoder 46. The decoder 46 supplies an enabling signal on one of its plurality of output lines to an enabling relay. The closing of that relay completes a circuit to a correspondingly connected load, causing the load to be energized. Energization for the corresponding load is provided through a supply line 47 connected to the receiving end of the strip 30. The DC current is conducted through the strip 30 and is supplied from the battery B connected through line 28 to the transmitting end of the strip 30. Therefore, the strip performs a dual function in that it conducts DC power and propagates ultrasonic mechanical waves.

Figure 2A:
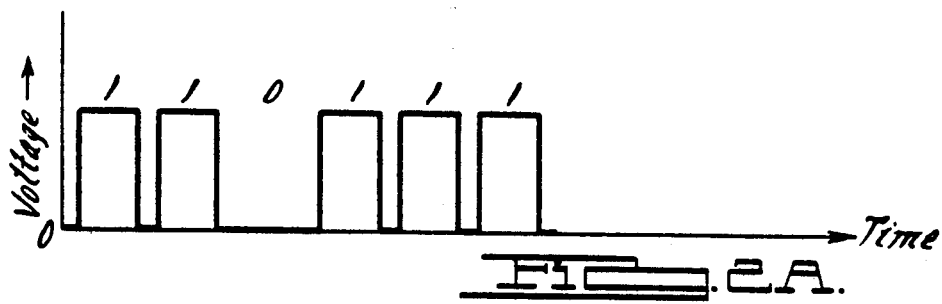
FIGS. 2A–2E illustrate the relationship of typical signal waveforms at various points in the FIG. 1 embodiment.
Figure 2B:
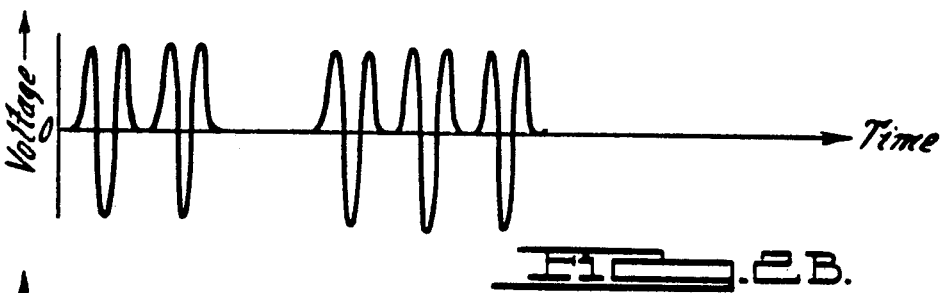
Figure 2C:
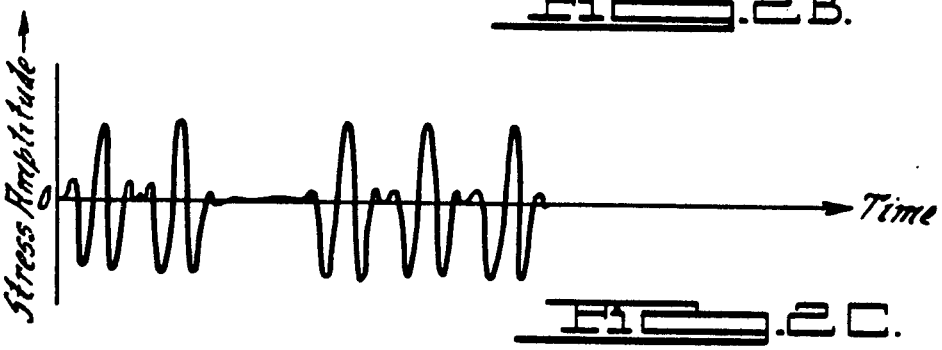

As an example of how the circuit functions, the following discussion refers to FIG. 1 and the waveforms shown in FIGS. 2A, 2B, 2C, 2D and 2E. Assume, for instance, that the 11th input switch $SW_{11}$ is closed. The digital word output from the encoder 21, corresponding to this condition, would be 110111. The first and last bits of the word indicating the respective start and stop identifiers. The center four bits indicate the 11th switch circuit. That digital word, output from the encoder 21, is shown in FIG. 2A as distinctive high and low level pulses separated by a relatively small time period. Each high level bit pulse from the encoder 21 provides gating of the carrier frequency (on the order of 1–2 MHz) generated in the transmitter unit 22. The transmitter 22, therefore, outputs a series of modulated pulses corresponding in time space to the digital word input and that output is shown in FIG. 2B. The carrier frequency generated by the transmitter unit 22 is selected to closely approximate the resonant frequency of the piezoelectric transducer 27 and each pulse is communicated to the transducer through the isolation transformer 24. The isolation transformer 24 has a secondary winding $25_s$ which has one end connected to the piezoelectric transducer 27 and the other end connected to the strip 30. The piezoelectric transducer 27 is bonded to the end face 34 of the strip 30 and is a thickness-shear mode transducer which generates a shear wave motion having a particle displacement direction parallel to the major surfaces 32 of the strip 30. The transmission transducer 27 converts the input RF pulse train into a train of stress pulses which propagate the length of the strip. The transmitted stress waves are illustrated in FIG. 2C.

Figure 2D:
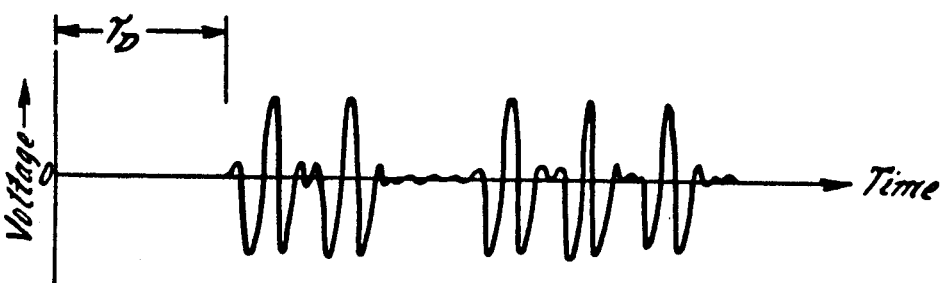

Upon traveling the length of the transmission medium 30, the ultrasonic mechanical wave pulses are converted back again to electrical energy pulses by the receiver transducer 41 bonded to the receiving end face 35 of the strip 30 and are shown in FIG. 2D. A time delay is associated with the reception of the ultrasonic signals that is dependent upon the material employed for the strip 30, as well as the length of that strip.

Figure 2E:
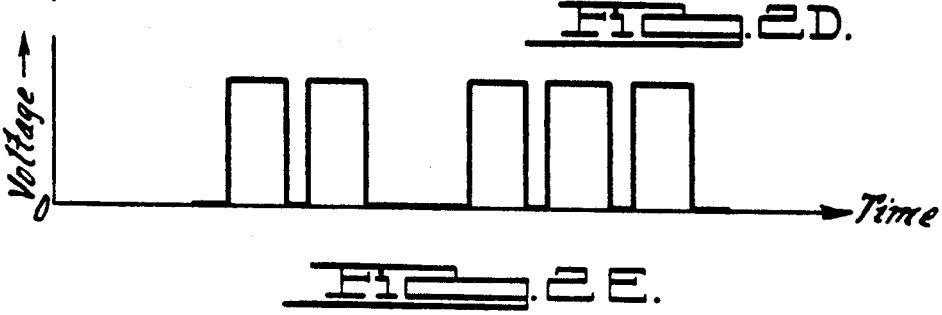

The electrical energy pulses, shown in FIG. 2D, are converted to the DC bit pulses shown in FIG. 2E by the receiver and pulse regenerator circuit 45. The decoder 46 receives the bit pulses and therefore enables the 11th enabling relay $R_{11}$ that controls the corresponding 11th load. Of course, the term enabling relay is generic for purposes of discussion, since those devices may be embodied in any conventional form, including semiconductor power switches.

The structure of the strip 30 is shown in FIG. 3. The strip 30 is formed as an elongated unitary piece of aluminum having opposing major surfaces 32, edge faces 33 and end faces 34 and 35 respectively (end face 35 is identical to end face 34 and is not shown in FIG. 3). The thickness of the aluminum strip is selected so that the strip will act as a mechanical waveguide for the lowest order mode of shear wave propagation that is non-dispersive and for which the particle displacement amplitude is constant across the thickness. In this instance, the thickness of the strip is selected to be less than half the acoustic wavelength, which guarantees that the energy propagates in a non-dispersive mode. The length of the bar-shaped piezoelectric transducer 27 mounted on the end face 34 is selected to be at least 10 wavelengths. The width of the strip 30 is somewhat greater than the length of the transducer 27 so that the transmitted beam is confined in a central lobe away from the edge of the strip 30. The edges 33 of the strip 30 are covered with an acoustic absorber that tends to absorb any secondary or spurious wave motions that are generated when energy from the main beam spreads out and interacts with the edges of the strip 30.

The absorber is in the form of a dense plastic insulator 37 which runs the length of the strip 30. The dense plastic insulator 37 is held away from the major surfaces 32 of the strip 30 by an inner core of foamed plastic 36. The foamed plastic 36, in combination with dense plastic insulator 37, provides electrical insulation and protection against dirt and moisture contamination while at the same time providing negligible mechanical loading to the major faces 32.

FIG. 4 illustrates an embodiment of a plug-in type connector used for terminating the strip 30, as illustrated in FIGS. 1 and 3. In this embodiment, the D.C. power terminals 26 and 28 are electrically connected to edge faces 33 while terminals 23' and 23" are connected to the primary winding $23_p$ of the isolation transformer 24. A housing 62 is formed of potting material which sets the location for the terminals and provides a rigid mechanical connection to the edges 33 of the strip 30. The housing 62 does not, however, contact the major surfaces 32 since such contact would cause mechanical loading and adversely affect propagation of the ultrasonic waves.

In a typical installation, the aluminum strip 30 would have a width on the order of 0.5 in. (12.7 mm) a thickness of approximately 0.025 in. (0.635 mm) and a length of approximately 10 ft. (3.05 M). The electrical resistance of such an aluminum strip would be about 0.1 ohm; and the insertion loss in the transmission of a pulse wave signal in the range of 1 to 2 MHz through such a strip would be less than 10 dB.

While it is apparent that many modifications and variations may be implemented without departing from the scope of the novel concept of this invention, it is intended by the appended claims to cover all such modifications and variations which fall within the true spirit and scope of the invention.

I claim:

1. An insulated transmission medium defining a path for propagating both ultrasonic waves and electromagnetic energy therealong, comprising:
   an elongated strip of metal having low resistance properties with respect to both ultrasonic wave propagation and electromagnetic energy conduction and having a width dimension which is at least 20 times greater than its thickness dimension;
   a core of insulating material extending substantially over the length and width of said strip and having the properties of a high dielectric and negligible damping to ultrasonic waves propagating along the strip; and
   an outer insulator encasing said core insulator and said strip, and contacting at least the edges of said strip substantially along its length and having properties of a high dielectric and high damping to ultrasonic waves occurring at the edges of said strip.

2. A transmission medium, as in claim 1, functioning in conjunction with a piezoelectric transducer mounted on one end of said strip so that when electrically driven at its resonant frequency, said transducer generates ultrasonic wave vibrations having a direction of propagation along the length of said strip.

3. A transmission medium, as in claim 2, functioning in conjunction with a source of DC voltage and said strip being connected to said source.

4. A transmission medium, as in claim 3, wherein said core insulator material is a foamed plastic material.

5. A transmission medium, as in claim 1, wherein said core insulator material is a foamed plastic material.

6. A transmission medium, as in claim 2, wherein said core insulator material is a foamed plastic material.

* * * * *